UNITED STATES PATENT OFFICE.

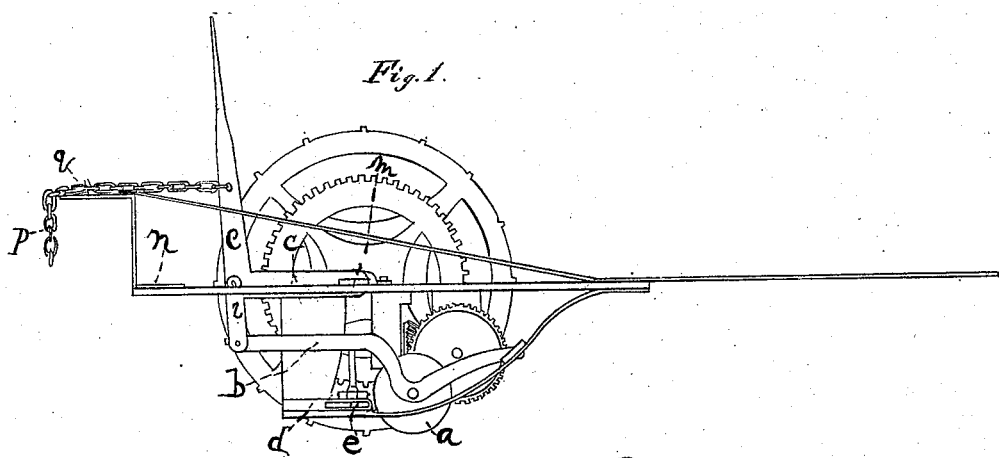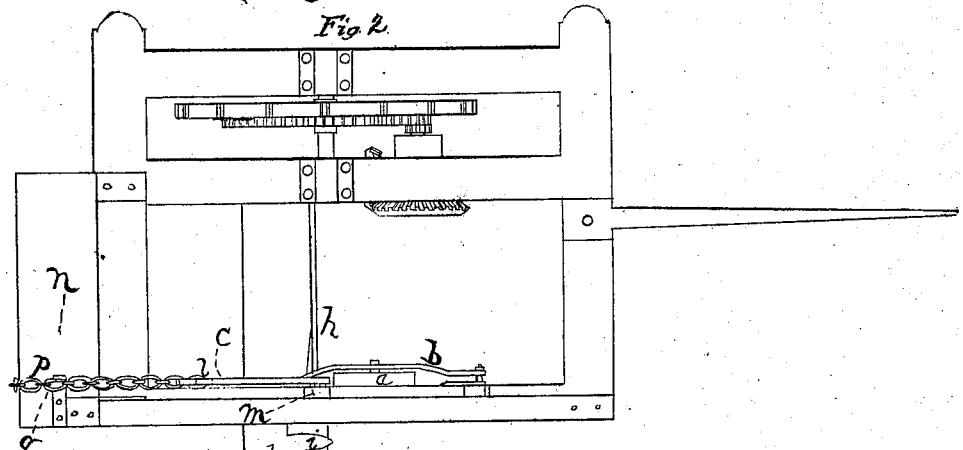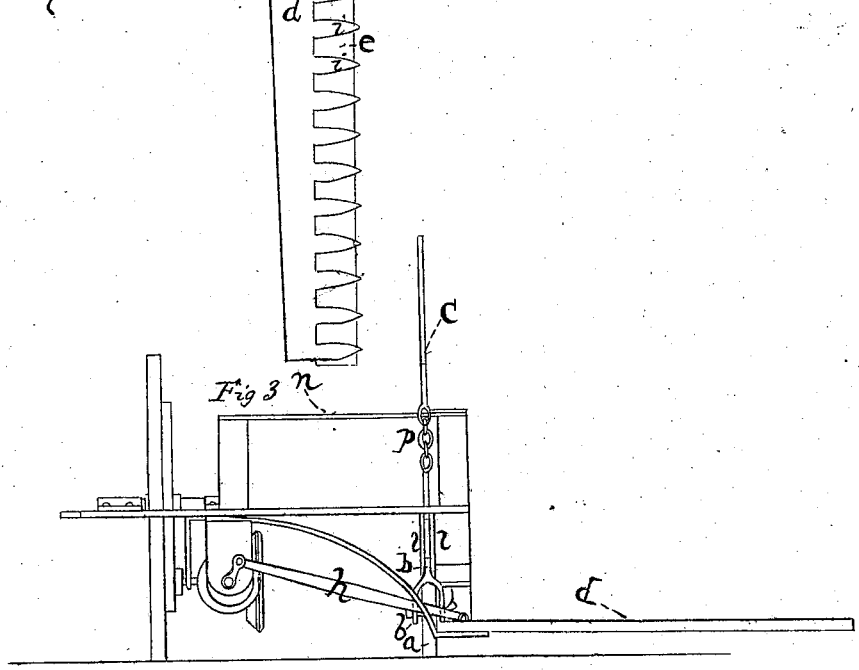

JAS. H. MAYDOLE AND A. W. MORSE, OF EATON, NEW YORK.

IMPROVEMENT IN GRASS-HARVESTERS.

Specification forming part of Letters Patent No. 12,363, dated February 6, 1855.

*To all whom it may concern:*

Be it known that we, JAS. H. MAYDOLE and ALBERT W. MORSE, of Eaton, in the county of Madison and State of New York, have invented a new and useful Improvement in Grass-Harvesters; and we do hereby declare that the following is a full and exact description thereof, reference being had to the accompanying drawings, making a part of this specification—

Figure 1 being a side view, Fig. 2 a top view, and Fig. 3 a rear elevation, of our improved grass-harvester.

The nature of our invention consists in combining a roller, $a$, with a grass-harvester by means of the levers $b$ and $c$, and the parts in connection with them or their equivalents in such a manner that a person riding upon the seat of the machine can elevate or depress the arm $d$, which carries and guides the cutter-plate $e$, causing the whole weight of said arm and cutter-plate to rest upon the said roller, or allow said arm to rest upon the ground, as circumstances may require. The said roller $a$ is pivoted between the united levers $b\ b$. The forward ends of the levers $b\ b$ are jointed to the machine in such a manner as to bring the roller $a$ immediately in front of the pitman $h$, and nearly on a line with the extremities of the fingers $i\ i$, as shown in Figs. 1 and 2. The rear ends of the united levers $b\ b$ are jointed to the angular lever $c$ by means of the bridle-pieces $l\ l$. The horizontal portion of the angular-lever $c$ is jointed to the frame of the machine at $m$, and the vertical portion of said lever rises in front of the seat $n$. By means of the chain $p$, which is connected to the vertical portion of the lever $c$, and the catch $q$, which rises from the end of the seat $n$, the roller $a$ can be so adjusted as to elevate the cutter-arm $d$ to any desired height; or by the operator's taking hold of the upright portion of said lever he can at any moment elevate the arm $d$, thus making the position of the cutter-supporting arm $d$ entirely independent of the position of the point of draft, which is a very great advantage, as it is well known that heretofore the elevation or depression of the cutters has been effected by the adjustment of the point of draft, and that to turn around the grass-harvesters as heretofore constructed the operator has to get off of the machine and lift up and carry around the lever $d$ by hand, whereas our improved machine can be operated with the cutters upon or at any desired distance from the ground, and be turned around without the necessity of the driver or operator getting off of the machine, and at the same time performing better work and producing a great saving of power when compared with any other grass-harvester known to the subscribers.

In taking the harvester from field to field and from one place to another our adjustable and controllable roller can be so adjusted as to bear the weight of the cutter-lever $d$ and keep it clear of the earth.

What we claim as our invention, and desire to secure by Letters Patent, is—

The combination of the adjustable and controllable roller $a$ with a grass-harvester, substantially in the manner and for the purpose herein set forth.

The above specification of our improvement in grass-harvesters signed and witnessed this 31st day of October, 1854.

JAS. H. MAYDOLE.
    ALBERT W. MORSE.

Witnesses:
 C. W. BURRITT,
 B. F. CRANE.